United States Patent
Mohanty et al.

(10) Patent No.: US 12,101,230 B2
(45) Date of Patent: Sep. 24, 2024

(54) SMART FAILURE PREDICTION AND SEAMLESS PROCESSING IN MESSAGING SYSTEMS

(71) Applicant: Dell Products L.P., Round Rock, TX (US)

(72) Inventors: Bijan Kumar Mohanty, Austin, TX (US); Shamik Kacker, Austin, TX (US); Hung Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/061,513

(22) Filed: Dec. 5, 2022

(65) Prior Publication Data

US 2024/0187309 A1 Jun. 6, 2024

(51) Int. Cl.
*H04L 41/147* (2022.01)
*H04L 41/0668* (2022.01)
*H04L 41/16* (2022.01)

(52) U.S. Cl.
CPC ........ *H04L 41/147* (2013.01); *H04L 41/0668* (2013.01); *H04L 41/16* (2013.01)

(58) Field of Classification Search
CPC ... H04L 41/147; H04L 41/0668; H04L 41/16; H04L 41/0233; H04L 41/085; H04L 41/06; H04L 41/149; H04L 41/0654; H04L 41/0631; H04L 41/0636
USPC .......................................................... 709/224
See application file for complete search history.

(56) References Cited

U.S. PATENT DOCUMENTS

| | | | |
|---|---|---|---|
| 7,290,056 B1 * | 10/2007 | McLaughlin, Jr. | H04L 43/0852 709/201 |
| 7,512,668 B2 * | 3/2009 | Koegel | G06Q 10/10 709/219 |
| 11,415,425 B1 * | 8/2022 | Merchant | H04L 41/16 |
| 2005/0240667 A1 * | 10/2005 | Koegel | G06Q 10/10 709/223 |
| 2007/0156808 A1 * | 7/2007 | Koegel | G06F 9/546 709/203 |
| 2008/0022015 A1 * | 1/2008 | Stalling | H04L 67/10 709/248 |

(Continued)

OTHER PUBLICATIONS

Wang et al., "Adding Resilience to Message Oriented Middleware," SERENE'10, Apr. 13-16, 2010, London, United Kingdom Copyright © 2010 ACM 978-1-4503-0289-0/10/04. (Year: 2010).*

(Continued)

*Primary Examiner* — Alina A Boutah
(74) *Attorney, Agent, or Firm* — DALY, CROWLEY, MOFFORD & DURKEE, LLP

(57) ABSTRACT

In one aspect, an example methodology implementing the disclosed techniques includes, by a computing device, receiving a message for delivery to a message-oriented middleware (MOM) server and determining whether an anomaly is predicted in the MOM server. The method also includes, by the computing device, responsive to a determination that an anomaly is predicted in the MOM server, identifying an alternate MOM server for delivery of the message, and routing the message to the alternate MOM server. The method may also include, by the computing device, responsive to a determination that an anomaly is not predicted in the MOM server, delivering the message to the MOM server.

20 Claims, 8 Drawing Sheets

(56) References Cited

U.S. PATENT DOCUMENTS

| | | | |
|---|---|---|---|
| 2008/0137546 A1* | 6/2008 | Boyd | H04L 47/10 |
| | | | 370/252 |
| 2018/0114234 A1* | 4/2018 | Fighel | G06Q 30/016 |
| 2020/0293386 A1* | 9/2020 | Dinh | H04L 67/562 |
| 2020/0364607 A1* | 11/2020 | BahenaTapia | G06N 7/01 |
| 2021/0126837 A1* | 4/2021 | Dinh | G06F 3/04842 |
| 2021/0133076 A1* | 5/2021 | Su | H04L 43/0858 |
| 2021/0135966 A1* | 5/2021 | Dinh | G06N 5/01 |
| 2021/0200612 A1* | 7/2021 | Martyanov | G06F 40/279 |
| 2022/0201025 A1* | 6/2022 | Ross | G06F 9/546 |
| 2022/0318118 A1* | 10/2022 | Adamson | G06F 11/3419 |
| 2023/0010417 A1* | 1/2023 | Mishra | G06N 5/01 |
| 2023/0229574 A1* | 7/2023 | Gandluri | G06F 11/3006 |
| | | | 714/4.11 |
| 2023/0344845 A1* | 10/2023 | Cady | H04L 63/1425 |

OTHER PUBLICATIONS

Wang et al., "Anomaly Detection in the Case of Message Oriented Middleware," MidSec'08, Dec. 1-5, 2008 Leuven, Belgium. Copyright 2008 ACM 978-1-60558-363-1/08/12 (Year: 2008).*

* cited by examiner

SMART FAILURE PREDICTION AND SEAMLESS PROCESSING IN MESSAGING SYSTEMS

BACKGROUND

Message-oriented middleware (MOM) is increasingly becoming the backbone of integration in enterprise applications. MOM is communication architecture based on message transfer that provides various end-to-end data communication services in a distributed network, including various functions of real-time data transmission, reliable queues, and event services, among others. MOM allows distributed software components (e.g., applications) that have been developed independently to communicate and exchange data with one another by sending and receiving messages. MOM's theoretical design principle is for usage anywhere. However, different MOM vendors provide specific libraries and user interface (UI) connectors to integrate between various source and target applications with different parameters. These heterogenous libraries are not consistent across the different MOM platforms, which add to the complexity associated with interfacing the MOM platforms. Furthermore, debugging utilities provided by the various MOM vendors are reactive (e.g., lacking in proactive dynamic capability) and may require deep product knowledge by users.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, by a computing device, receiving a message for delivery to a message-oriented middleware (MOM) server and determining whether an anomaly is predicted in the MOM server. The method also includes, by the computing device, responsive to a determination that an anomaly is predicted in the MOM server, identifying an alternate MOM server for delivery of the message, and routing the message to the alternate MOM server.

In some embodiments, the message is received by a messaging abstraction layer.

In some embodiments, the message is received from an application via a Representational State Transfer (REST) application program interface (API) call.

In some embodiments, the message is received from another MOM server via an API supported by the another MOM server.

In some embodiments, the prediction of the anomaly in the MOM server is by a first machine learning (ML) model. In one aspect, the first ML model includes an isolation forest.

In some embodiments, the first ML model is built using a modeling dataset generated from historical server metrics of MOM servers.

In some embodiments, the alternate MOM server is predicted using a second ML model. In one aspect, the second ML model includes a decision tree-based algorithm.

In some embodiments, the second ML model is built using a modeling dataset generated from performance metrics associated with historical messaging transactions of MOM servers.

In some embodiments, the method also includes, by the computing device, responsive to a determination that an anomaly is not predicted in the MOM server, delivering, the message to the MOM server.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

It is appreciated herein that, despite their many benefits, existing messaging and event-driven tools provided by message-oriented middleware (MOM) vendors have a number of shortcomings that contribute to messaging outages and delays in processing of mission critical enterprise systems. For example, existing enterprise messaging systems lack intelligence in predicting MOM server failures. This inhibits any proactive handling of failures, thus incurring in expensive outages and delay in processing of mission critical transactions, such as order processing transactions. As another example, existing enterprise messaging systems lack the intelligence in recommending which MOM server is best suited in the event of a failure of a specific MOM server. In large enterprises with multitude of MOM servers, this capability is may be key for seamless handling of message failures.

Certain embodiments of the concepts, techniques, and structures disclosed herein are directed to predicting upcoming outages (e.g., failures) in MOM platforms before the outages occur and identifying suitable alternate MOM platforms for seamless handling and optimal processing of messages. This can be achieved by providing a messaging abstraction module which allows applications (e.g., enterprise applications) to connect to various MOM platforms, and send messages to the MOM platforms via the messaging abstraction module. In some embodiments, in response to receiving a message for delivery to a MOM platform, the messaging abstraction module can check to determine whether an anomaly is predicted in the MOM platform. In other words, the messaging abstraction module can check to determine whether an upcoming outage is predicted for the MOM platform. If an anomaly is not predicted in the MOM platform, the messaging abstraction module can deliver the message to the MOM platform. Conversely, if an anomaly is predicted in the MOM platform, the messaging abstraction module can determine an alternate MOM platform and route the message to the alternate MOM platform. The messaging abstraction module does not deliver the message to the MOM platform predicted to have an upcoming outage. The techniques described herein can be used to improve the efficiency and utility of existing message handling systems by providing seamless handling and processing of messages even in cases of MOM platform outages.

Figure 1:
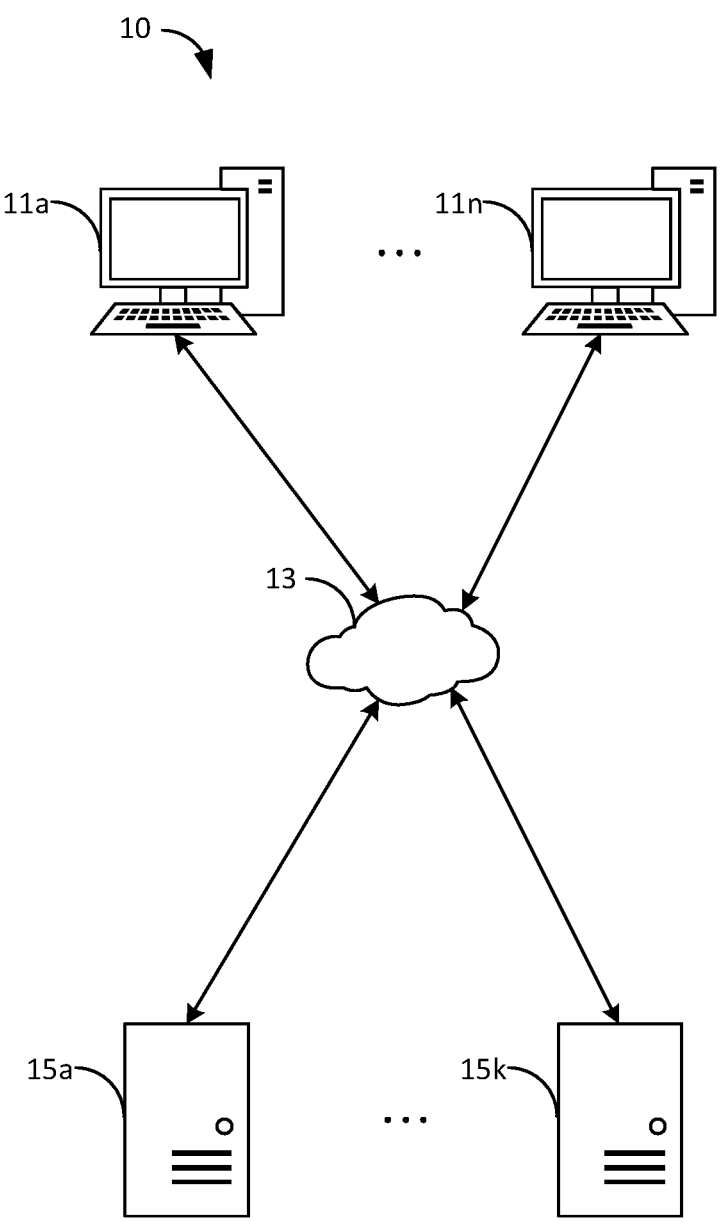
FIG. 1 is a diagram illustrating an example network environment of computing devices in which various aspects of the disclosure may be implemented, in accordance with an embodiment of the present disclosure.

Referring now to FIG. 1, shown is a diagram illustrating an example network environment 10 of computing devices in which various aspects of the disclosure may be implemented, in accordance with an embodiment of the present disclosure. As shown, environment 10 includes one or more client machines 11a-11n (11 generally), one or more server machines 15a-15k (15 generally), and one or more networks 13. Client machines 11 can communicate with server machines 15 via networks 13. Generally, in accordance with client-server principles, a client machine 11 requests, via network 13, that a server machine 15 perform a computation or other function, and server machine 15 responsively fulfills the request, optionally returning a result or status indicator in a response to client machine 11 via network 13.

In some embodiments, client machines 11 can communicate with remote machines 15 via one or more intermediary appliances (not shown). The intermediary appliances may be positioned within network 13 or between networks 13. An intermediary appliance may be referred to as a network interface or gateway. In some implementations, the intermediary appliance may operate as an application delivery controller (ADC) in a datacenter to provide client machines (e.g., client machines 11) with access to business applications and other data deployed in the datacenter. The intermediary appliance may provide client machines with access to applications and other data deployed in a cloud computing environment, or delivered as Software as a Service (SaaS) across a range of client devices, and/or provide other functionality such as load balancing, etc.

Client machines 11 may be generally referred to as computing devices 11, client devices 11, client computers 11, clients 11, client nodes 11, endpoints 11, or endpoint nodes 11. Client machines 11 can include, for example, desktop computing devices, laptop computing devices, tablet computing devices, mobile computing devices, workstations, and/or hand-held computing devices. Server machines 15 may also be generally referred to a server farm 15. In some embodiments, a client machine 11 may have the capacity to function as both a client seeking access to resources provided by server machine 15 and as a server machine 15 providing access to hosted resources for other client machines 11.

Server machine 15 may be any server type such as, for example, a file server, an application server, a web server, a proxy server, a virtualization server, a deployment server, a Secure Sockets Layer Virtual Private Network (SSL VPN) server; an active directory server; a cloud server; or a server executing an application acceleration program that provides firewall functionality, application functionality, or load balancing functionality. Server machine 15 may execute, operate, or otherwise provide one or more applications. Non-limiting examples of applications that can be provided include software, a program, executable instructions, a virtual machine, a hypervisor, a web browser, a web-based client, a client-server application, a thin-client, a streaming application, a communication application, or any other set of executable instructions.

In some embodiments, server machine 15 may execute a virtual machine providing, to a user of client machine 11, access to a computing environment. In such embodiments, client machine 11 may be a virtual machine. The virtual machine may be managed by, for example, a hypervisor, a virtual machine manager (VMM), or any other hardware virtualization technique implemented within server machine 15.

Networks 13 may be configured in any combination of wired and wireless networks. Network 13 can be one or more of a local-area network (LAN), a wide area network (WAN), a metropolitan area network (MAN), a virtual private network (VPN), a primary public network, a primary private network, the Internet, or any other type of data network. In some embodiments, at least a portion of the functionality associated with network 13 can be provided by a cellular data network and/or mobile communication network to facilitate communication among mobile devices. For short range communications within a wireless local-area network (WLAN), the protocols may include 802.11, Bluetooth, and Near Field Communication (NFC).

Figure 2:
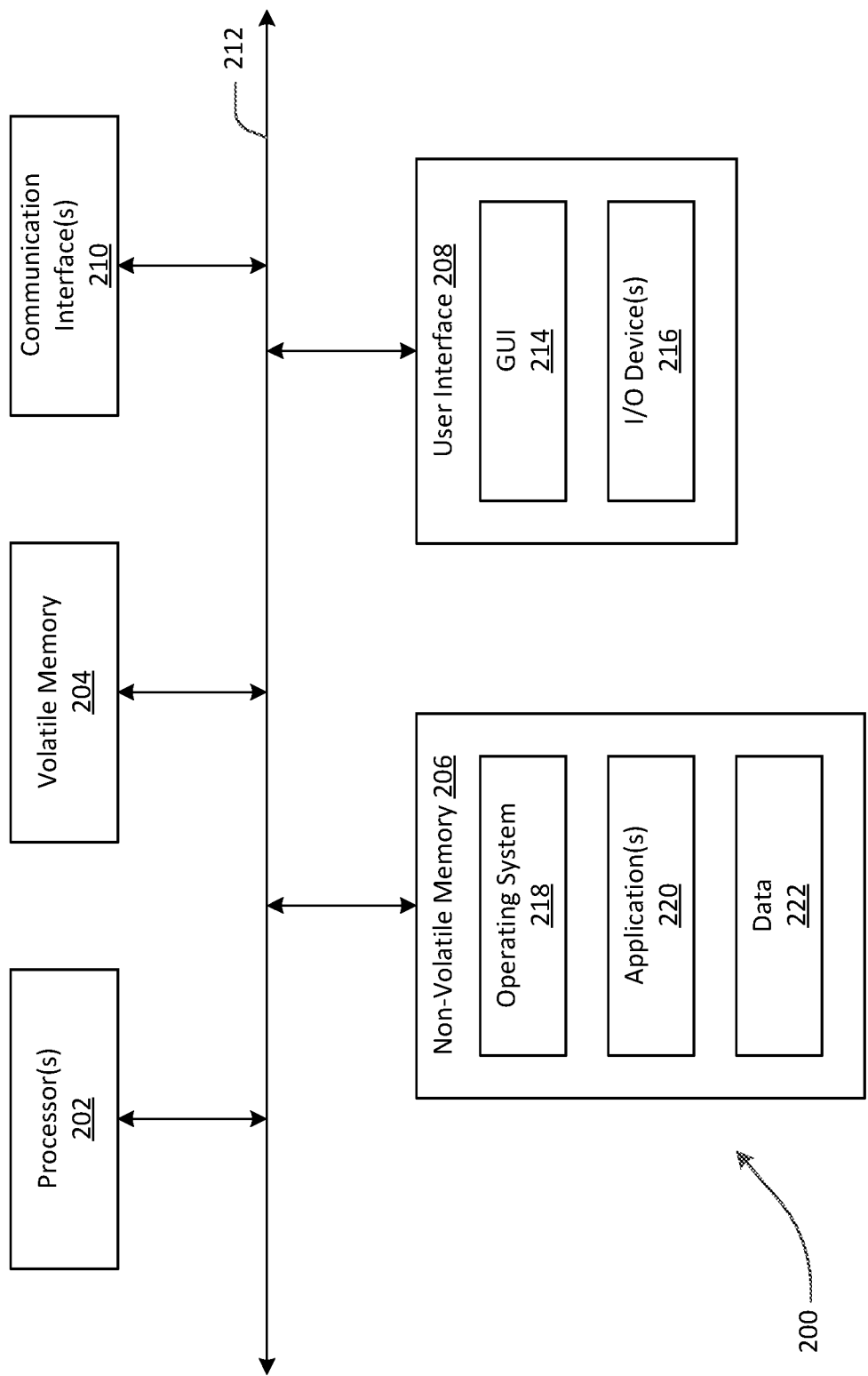
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 200 in which various aspects of the disclosure may be implemented, in accordance with an embodiment of the present disclosure. For instance, client machines 11 and/or server machines 15 of FIG. 1 can be substantially similar to computing device 200. As shown, computing device 200 includes one or more processors 202, a volatile memory 204 (e.g., random access memory (RAM)), a non-volatile memory 206, a user interface (UI) 208, one or more communications interfaces 210, and a communications bus 212.

Non-volatile memory 206 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 208 may include a graphical user interface (GUI) 214 (e.g., a touchscreen, a display, etc.) and one or more input/output (I/O) devices 216 (e.g., a mouse, a keyboard, a microphone, one or more speakers, one or more cameras, one or more biometric scanners, one or more environmental sensors, and one or more accelerometers, etc.).

Non-volatile memory 206 stores an operating system 218, one or more applications 220, and data 222 such that, for example, computer instructions of operating system 218 and/or applications 220 are executed by processor(s) 202 out of volatile memory 204. In one example, computer instructions of operating system 218 and/or applications 220 are executed by processor(s) 202 out of volatile memory 204 to perform all or part of the processes described herein (e.g., processes illustrated and described with reference to FIGS. 4 through 8). In some embodiments, volatile memory 204 may include one or more types of RAM and/or a cache memory that may offer a faster response time than a main memory. Data may be entered using an input device of GUI 214 or received from I/O device(s) 216. Various elements of computing device 200 may communicate via communications bus 212.

The illustrated computing device 200 is shown merely as an illustrative client device or server and may be implemented by any computing or processing environment with any type of machine or set of machines that may have suitable hardware and/or software capable of operating as described herein.

Processor(s) 202 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 202 may be analog, digital or mixed signal. In some embodiments, processor 202 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 210 may include one or more interfaces to enable computing device 200 to access a computer network such as a Local Area Network (LAN), a Wide Area Network (WAN), a Personal Area Network (PAN), or the Internet through a variety of wired and/or wireless connections, including cellular connections.

In described embodiments, computing device 200 may execute an application on behalf of a user of a client device. For example, computing device 200 may execute one or more virtual machines managed by a hypervisor. Each virtual machine may provide an execution session within which applications execute on behalf of a user or a client device, such as a hosted desktop session. Computing device 200 may also execute a terminal services session to provide a hosted desktop environment. Computing device 200 may provide access to a remote computing environment including one or more applications, one or more desktop applications, and one or more desktop sessions in which one or more applications may execute.

Figure 3:
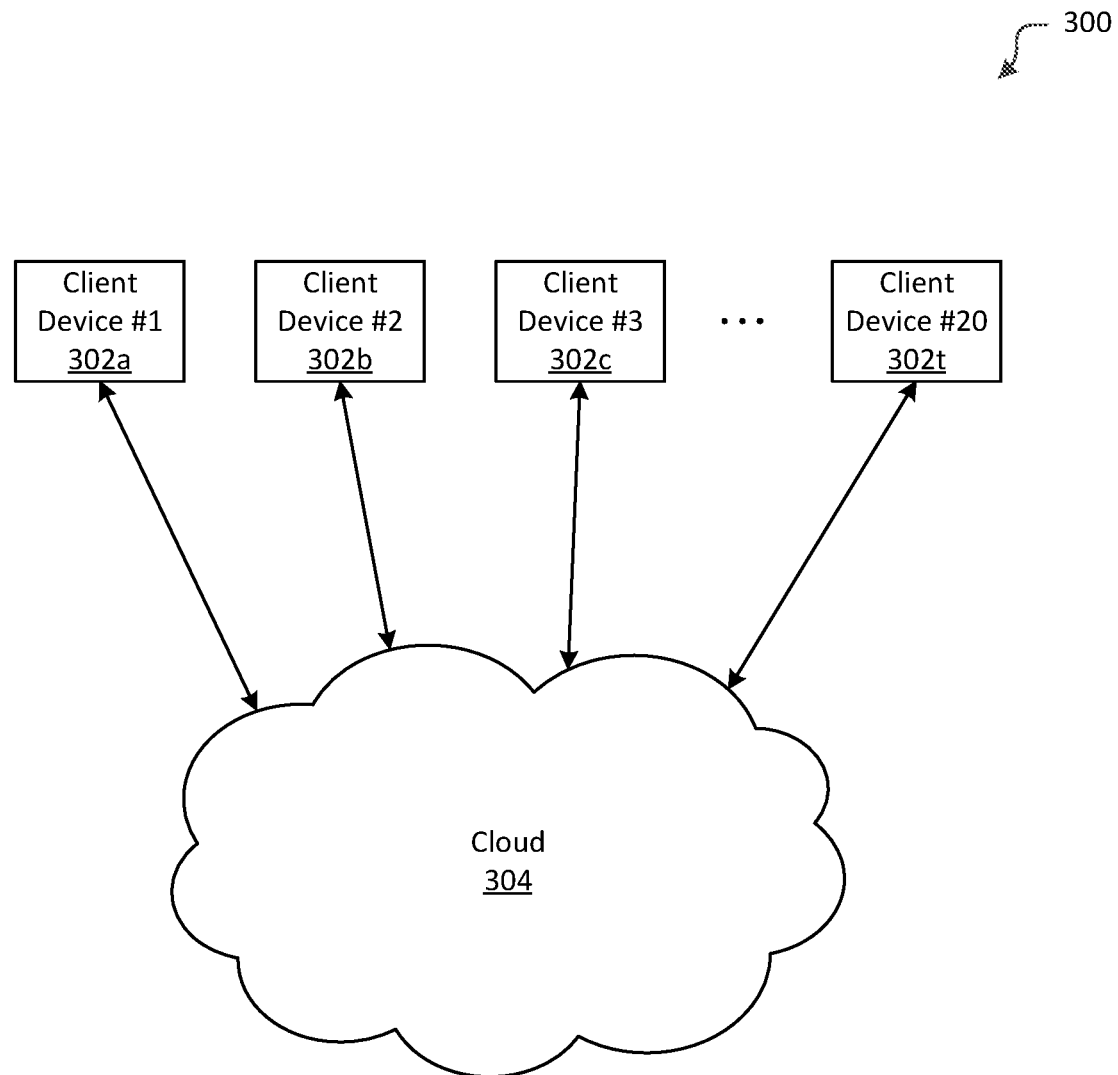
FIG. 3 is a diagram of a cloud computing environment in which various aspects of the concepts described herein may be implemented.

Referring to FIG. 3, shown is a diagram of a cloud computing environment 300 in which various aspects of the concepts described herein may be implemented. Cloud computing environment 300, which may also be referred to as a cloud environment, cloud computing, or cloud network, can provide the delivery of shared computing resources and/or services to one or more users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more client devices 302a-302t (such as client machines 11 and/or computing device 200 described above) may be in communication with a cloud network 304 (sometimes referred to herein more simply as a cloud 304). Cloud 304 may include back-end platforms such as, for example, servers, storage, server farms, or data centers. The users of clients 302a-302t can correspond to a single organization/tenant or multiple organizations/tenants. More particularly, in one implementation, cloud computing environment 300 may provide a private cloud serving a single organization (e.g., enterprise cloud). In other implementations, cloud computing environment 300 may provide a community or public cloud serving one or more organizations/tenants.

In some embodiments, one or more gateway appliances and/or services may be utilized to provide access to cloud computing resources and virtual sessions. For example, a gateway, implemented in hardware and/or software, may be deployed (e.g., reside) on-premises or on public clouds to provide users with secure access and single sign-on to virtual, SaaS, and web applications. As another example, a secure gateway may be deployed to protect users from web threats.

In some embodiments, cloud computing environment 300 may provide a hybrid cloud that is a combination of a public cloud and a private cloud. Public clouds may include public servers that are maintained by third parties to client devices 302a-302t or the enterprise/tenant. The servers may be located off-site in remote geographical locations or otherwise.

Cloud computing environment 300 can provide resource pooling to serve clients devices 302a-302t (e.g., users of client devices 302a-302n) through a multi-tenant environment or multi-tenant model with different physical and virtual resources dynamically assigned and reassigned responsive to different demands within the respective environment. The multi-tenant environment can include a system or architecture that can provide a single instance of software, an application, or a software application to serve multiple users. In some embodiments, cloud computing environment 300 can include or provide monitoring services to monitor, control, and/or generate reports corresponding to the provided shared resources and/or services.

In some embodiments, cloud computing environment 300 may provide cloud-based delivery of various types of cloud computing services, such as Software as a service (Saas), Platform as a Service (PaaS), Infrastructure as a Service (IaaS), and/or Desktop as a Service (DaaS), for example. IaaS may refer to a user renting the use of infrastructure resources that are needed during a specified time period. IaaS providers may offer storage, networking, servers, or virtualization resources from large pools, allowing the users to quickly scale up by accessing more resources as needed. PaaS providers may offer functionality provided by IaaS, including, e.g., storage, networking, servers, or virtualization, as well as additional resources such as, for example, operating systems, middleware, and/or runtime resources. SaaS providers may offer the resources that PaaS provides, including storage, networking, servers, virtualization, operating systems, middleware, or runtime resources. SaaS providers may also offer additional resources such as, for example, data and application resources. DaaS (also known as hosted desktop services) is a form of virtual desktop service in which virtual desktop sessions are typically delivered as a cloud service along with the applications used on the virtual desktop.

Figure 4:
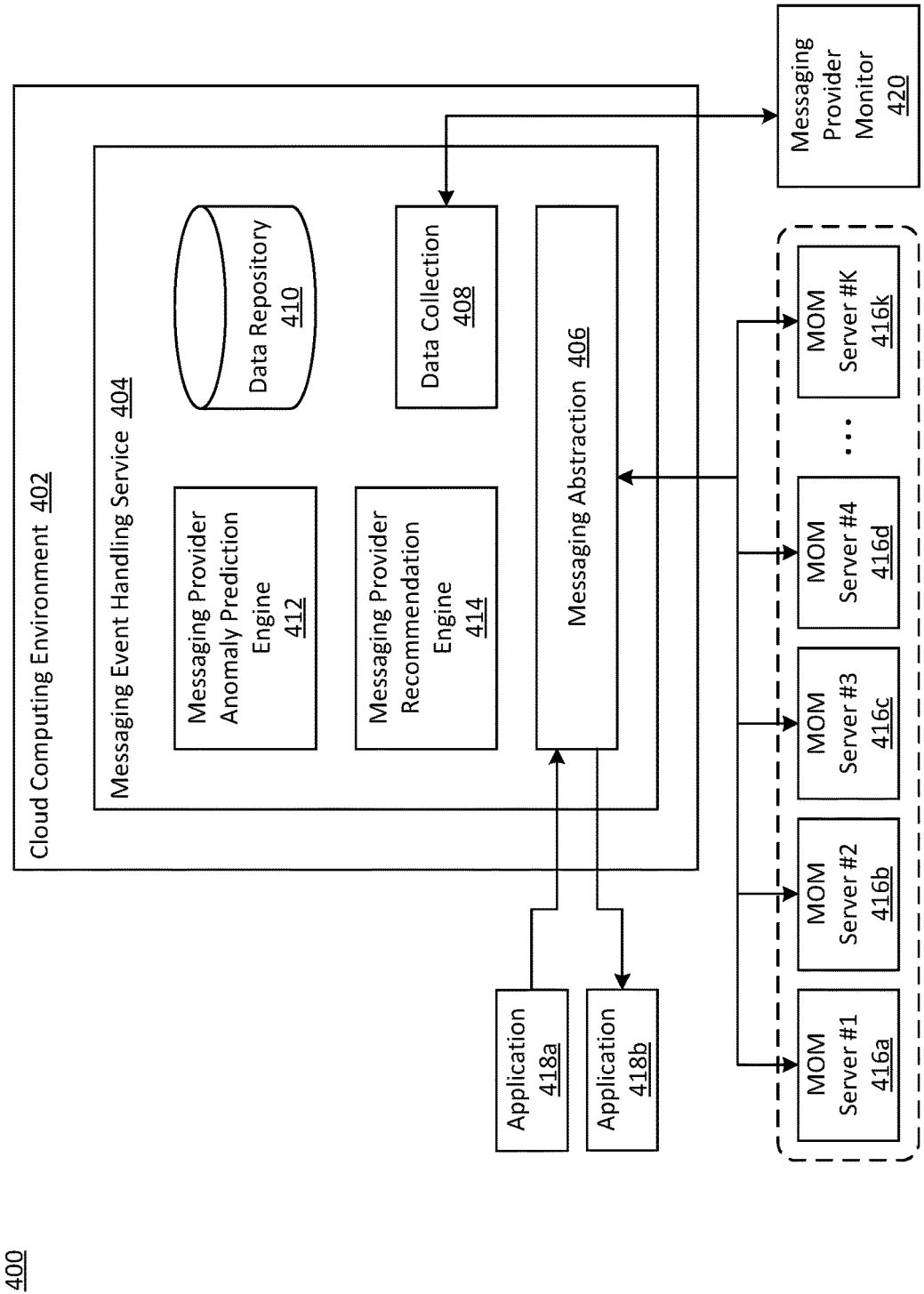
FIG. 4 is a block diagram of an illustrative system for smart failure prediction and seamless handling in messaging systems, in accordance with an embodiment of the present disclosure.

FIG. 4 is a block diagram of an illustrative system 400 for smart failure prediction and seamless handling in messaging systems, in accordance with an embodiment of the present disclosure. Illustrative system 400 includes a messaging event handling service 404 provided within a cloud computing environment 402. Cloud computing environment 402 can be the same as or similar to cloud computing environment 300 of FIG. 3. In the example of FIG. 4, messaging event handling service 404 can be provided as a service (e.g., a microservice) within cloud computing environment 402. An organization, such as a company, an enterprise, or other entity that utilizes messaging middleware (e.g., a message-oriented middleware (MOM)) to integrate distributed applications (e.g., enterprise applications) may implement messaging event handling service 404 to provide a messaging framework for predicting anomalies in MOM platforms and identifying alternate MOM platforms for seamless handling of messages in case of anomaly prediction. In some embodiments, the identified alternate MOM platform can be an optimal MOM platform for seamless processing of the message. Messaging event handling service 404 can be implemented as computer instructions executable to perform the corresponding functions disclosed herein. Messaging event handling service 404 can be logically and/or physically organized into one or more components.

In the example of FIG. 4, messaging event handling service 404 includes a messaging abstraction module 406, a data collection module 408, a data repository 410, a messaging provider anomaly prediction engine 412, and a messaging provider recommendation engine 414. The various components of messaging event handling service 404 can communicate or otherwise interact utilizing application program interfaces (APIs), such as, for example, a Representational State Transfer (RESTful) API, a Hypertext Transfer Protocol Secure (HTTPS) API, or another suitable API, including combinations thereof.

Messaging event handling service 404 can include various other components (e.g., software and/or hardware components) which, for the sake of clarity, are not shown in FIG. 4. It is also appreciated that messaging event handling service 404 may not include certain of the components depicted in FIG. 4. For example, in certain embodiments, messaging event handling service 404 may not include one or more of the components illustrated in FIG. 4 (e.g., data repository 410), but messaging event handling service 404 may connect or otherwise couple to the one or more components via a communication interface. Thus, it should be appreciated that numerous configurations of messaging event handling service 404 can be implemented and the present disclosure is not intended to be limited to any particular one. That is, the degree of integration and distribution of the functional component(s) provided herein can vary greatly from one embodiment to the next, as will be appreciated in light of this disclosure.

Referring to messaging event handling service 404, messaging abstraction module 406 is operable to permit one or more applications 418a, 418b (418 generally) to seamlessly have access to and switch between multiple MOM servers 416a-416k (416 generally). MOM servers 416 can permit data exchange between distributed applications 418 by sending and receiving messages. MOM servers 416 can run on different OSs and/or platforms or different implementations of the same OS and/or platforms, include APIs and other components to route and deliver messages. For example, in some implementations, messaging abstraction module 406 can utilize message queues to allow the exchange of information (e.g., the sending and receiving of messages) between distributed application via one or more MOM servers 416. In the example of FIG. 4, application 418a can correspond to a message producer and application 418b can correspond to a message consumer. Applications 418 can communicate with messaging event handling service 404 via one or more computer networks (e.g., network 13 of FIG. 1 and/or cloud network 304 of FIG. 3). MOM servers 416 can correspond to different MOM servers from different messaging providers. Non-limiting examples of MOM servers 416 include KAFKA, RABBITMQ, ORACLE SOA, BOOMI, IBM WEBSPHERE, and SPRING BOOT. Message abstraction module 406 can be understood as providing a vendor-agnostic, messaging abstraction layer which is compatible with the various MOM servers 416.

To promote clarity in the drawings, FIG. 4 shows a single message producer (e.g., application 418a) and a single message consumer (e.g., application 418b) communicably coupled to messaging abstraction module 406. However, embodiments of message event handling service 404 and messaging abstraction module 406 can service very large numbers of message producers and message consumers (e.g., thousands of message producers and thousands of message consumers). Similarly, the number of MOM servers 416 shown in FIG. 4 is merely illustrative and the structures and techniques sought to be protected herein can be applied to any number of MOM servers 416 and different types of MOM servers 416.

In some embodiments, messaging abstraction module 406 can include APIs, such as REST APIs or other standard APIs, which provide applications 418 with access to and functionality to switch between the various MOM servers 416. The individual REST APIs can be configured to provide access to any of the MOM servers 416. The REST APIs allows MOM server 416 switching to be abstracted from applications 418 (e.g., abstracted from message producers and message consumers). For example, application 418a (e.g., a message producer) can make a REST API call to send a message to a destination (e.g., application 418b) managed by messaging abstraction module 406. In response to the REST API call, messaging abstraction module 418 can route and deliver the message via one or more of the MOM servers 416 for receipt by the destination.

In some embodiments, messaging abstraction module 406 can include APIs supported by MOM servers 416 (i.e., APIs native to MOM servers 416), which messaging abstraction module 406 can use to interface with the various MOM servers 416. For example, messaging abstraction module 406 can use the native APIs to receive messages from respective ones of the MOM servers 416. Messaging abstraction module 406 can also use the native APIs to deliver messages to respective ones of the MOM servers 416. A message delivered to a particular MOM server 416 may be a message from another MOM server 416 or a message from an application (e.g., a message provider).

In some embodiments, messaging abstraction module 406 is operable to predict upcoming outages in MOM servers 416 before the outages occur and identify suitable alternate MOM servers 416 for seamless handling and optimal processing of messages. For example, in response to receiving a message for delivery to one of the MOM servers 416 (e.g., MOM server 416a), messaging abstraction module 406 can check to determine whether an anomaly is predicted in MOM server 416a. In some embodiments, messaging provider anomaly prediction engine 412, described further below, can predict anomalies in MOM servers 416. If an anomaly is not predicted in MOM server 416a, messaging abstraction module 406 can deliver the message to MOM server 416a. Conversely, if an anomaly is predicted in MOM server 416a, messaging abstraction module 406 can determine an alternate MOM server (e.g., one of MOM servers 416b-416k) and route the message to the alternate MOM server. Messaging abstraction module 406 does not deliver the message to MOM server 416a predicted to have an upcoming outage. In some embodiments, messaging abstraction module 406 can utilize messaging provider recommendation engine 414, described further below, to obtain a recommendation of the alternate MOM server. In some embodiments, the alternate MOM server can be a MOM server that is optimal for the messaging transaction. The term "messaging transaction" as used herein refers, in addition to its ordinary meaning, to an exchange of a message, such as a sending and/or receiving of a message.

Data collection module 408 is operable to collect or otherwise retrieve server metrics from a messaging provider monitor 420. The server metrics include metrics and parameters of individual MOM servers 416. These metrics and parameters are captured during normal operating conditions of MOM servers 416 and during outages of MOM servers 416. In a general sense, the retrieved metrics may be indicative of the performance of MOM servers 416. Messaging provider monitor 420 may be an existing telemetry and monitoring system that collects metrics, such as, for example, server load and availability, disk space usage, memory consumption, performance, among others, from MOM servers 416. In other implementations, data collection module 408 can retrieve such metrics from one or more of the MOM servers 416. In any case, data collection module 408 may utilize APIs provided by messaging provider monitor 420 or the various MOM servers 416 to retrieve/query server metrics (e.g., server metric data) therefrom.

As mentioned previously, data collection module 408 can retrieve server metrics from messaging provider monitor 420. The server metrics can include information about individual MOM servers 416, such as queue depth, number of producers, number of consumers, messages ready, messages unacknowledged, central processing unit (CPU) utilization, memory utilization, and I/O utilization. This list of server metrics is merely illustrative and not intended to provide a complete list of the server metrics. Queue depth indicates the number of messages in the queue. Number of producers indicates the number of message producers actively sending messages. Number of consumers indicates the number of message consumers actively consuming messages. Messages ready indicate the number of messages that are ready to be sent or consumed (e.g., retrieved). Messages unacknowledged indicate the number of messages in the queue for which an acknowledgement (e.g., an acknowledgement of successful retrieval) has not been received from the consumers. CPU utilization indicates the amount of work being performed by the CPU (e.g., estimated average CPU usage) of the MOM server to perform its tasks (e.g., processing the messaging transactions). Memory utilization indicates the amount of memory being used (e.g., percentage of available memory being used) by the MOM server to perform its tasks. I/O utilization indicates the time being spent by the MOM server processing read/write request on all disks and partitions in performing its tasks.

In some embodiments, data collection module 408 can retrieve the server metrics from messaging provider monitor 420 and/or from various MOM servers 416 on a continuous or periodic basis (e.g., according to a predetermined schedule specified by the organization). In some embodiments, data collection module 408 can store the retrieved server metrics within data repository 410, where it can subsequently be retrieved and used. For example, the server metrics can be retrieved from data repository 410 and used to generate a modeling dataset for use in building an ML model (e.g., messaging provider anomaly prediction engine 412). In some embodiments, data repository 410 may correspond to a storage service within the computing environment of messaging event handling service 404.

Data collection module 408 is also operable to collect or otherwise retrieve performance metrics associated with messaging transactions of MOM servers 416 from messaging provider monitor 420. Data collection module 408 may retrieve the performance metrics associated with messaging transactions from messaging provider monitor 420 or from the various MOM servers 416. The performance metrics can be collected per messaging transaction (e.g., per message processed or otherwise handled by MOM servers 416). For example, for a particular messaging transaction, the performance metrics can include, performance, scalability, message type, message size, quality of service (QOS), average cost/latency, memory utilization, CPU utilization, queue depth, number of producers, and number of consumers. This list of performance metrics is merely illustrative and not intended to provide a complete list of the performance metrics. Performance indicates time taken to deliver the message from the message producer to the message consumer via the various MOM servers. Scalability indicates the throughput of the various MOM servers. Message type indicates a type of message (e.g., messaging, streaming, etc.). Message size indicates the size of the message. QoS indicates a reliability requirement (e.g., exactly once, at least once, etc.) needed in delivering the message. Average cost/latency indicates the average time taken by the various MOM servers to process messages (e.g., to process the messaging transactions). Memory utilization indicates the amount of memory used by the various MOM servers to process the message. CPU utilization indicates the amount of work performed by the CPUs of the various MOM servers to process the message. Queue depth indicates the number of messages per queue. Number of producers indicates the number of message producers actively sending messages via the various MOM servers. Number of consumers indicates the number of message consumers actively consuming messages via the various MOM servers.

In some embodiments, data collection module 408 can retrieve the performance metrics associated with individual messaging transactions from messaging provider monitor 420 and/or from various MOM servers 416 on a continuous or periodic basis (e.g., according to a predetermined schedule specified by the organization). In some embodiments, data collection module 408 can store the retrieved performance metrics within data repository 410, where it can subsequently be retrieved and used. For example, the performance metrics can be retrieved from data repository 410 and used to generate a modeling dataset for use in building an ML model (e.g., messaging provider recommendation engine 414).

Messaging provider anomaly prediction engine 412 is operable to predict anomalies in MOM servers. Anomalies in a MOM server may be indicative of an upcoming outage of the MOM server. For instance, in the example of FIG. 4, messaging provider anomaly prediction engine 412 can predict anomalies in any of MOM servers 406. In some embodiments, messaging provider anomaly prediction engine 412 can implement or include a machine learning (ML) algorithm that supports anomaly detection, such as an isolation forest algorithm. The ML algorithm can be trained using machine learning techniques with a modeling dataset composed of historical server metrics collected from the MOM servers (e.g., a modeling dataset generated using historical server metrics of the MOM servers). Non-limiting examples of server metrics that can be used to generate the modeling dataset include queue depth, number of producers, number of consumers, messages ready, messages unacknowledged, central processing unit (CPU) utilization, memory utilization, and I/O utilization. The historical server metrics may be retrieved from data repository 410. The historical server metrics include server metrics captured (or "recorded") during both normal operating conditions as well as during outages of the MOM servers. Since anomalies in MOM servers develop gradually (e.g., build over time), the ML algorithm can predict an upcoming outage in a MOM server once trained with the historical server metrics. As such, the generated ML model (i.e., the trained ML model) can, in response to input of various metrics and parameters of a MOM server, predict an anomaly in the MOM server. That is, the trained ML model is configured to predict whether an upcoming outage is expected for a MOM server.

In some embodiments, messaging provider anomaly prediction engine 412 can implement or include an isolation forest algorithm for anomaly detection in MOM servers. In this implementation, the isolation forest algorithm can leverage an unsupervised learning methodology for outlier detection of metrics from MOM servers to predict an upcoming outage. The isolation forest has the capacity to scale up to handle extremely large data sizes and high-dimensional problems with a large number of irrelevant attributes. The isolation forest has low linear time complexity and memory requirements. The isolation forest algorithm is also highly effective in dealing with swamping and masking effect. A masking effect is where a model predicts a normal behavior of a MOM server when the MOM server is anomalous. Similarly, swamping effect is where a model predicts an anomalous behavior when it's normal behavior of a MOM server.

In some embodiments, the isolation forest can use a decision tree ensemble method to detect outliers with the assumption that anomalies are few and easy to isolate with few conditions. In this outlier detection technique, anomalies can be identified among the normal observations by setting up a threshold value in the contamination parameter that can apply for real-time prediction. In more detail, the core of the isolation forest algorithm lies in "isolating" the anomaly by creating decision trees over random attributes. This random partitioning can produce shorter paths and, in some cases, significantly shorter paths since fewer instances of anomalies result in smaller partitions and distinguishable attribute values are more likely to be separated in early partitioning. As a result, when a forest (or "group") of random trees collectively produces shorter path lengths for some particular points, then they are highly likely to be anomalies. A larger number of splits can be required to isolate a normal point while an anomaly can be isolated by shorter number of splits. The number of splits determine the level at which the isolation happened and can be used to generate the anomaly score. The process may be repeated multiple times and the isolation level of each point can be recorded. Once an iteration completes, the anomaly score of each point/instance indicates the likeliness of an anomaly. The anomaly score may be a function of the average level at which the point is isolated. The top points/instances identified based on the anomaly score can be labeled as anomalies.

In some embodiments, messaging provider anomaly prediction engine 412 can predict anomalies in any of MOM servers 416 on a continuous or periodic basis. For example, messaging provider anomaly prediction engine 412 can predict anomalies in MOM servers 416 according to a predetermined schedule, such as, for example, every N (e.g., N=20) minutes. The schedule can vary for different organizations. The schedule can be configured by the organization as an organizational policy. Messaging provider anomaly prediction engine 412 can record the predictions (e.g., "anomaly" or "normal") generated for the individual MOM servers 416 within a data repository (e.g., data repository 410), where it can subsequently be accessed. Further description of the ML algorithm (e.g., an isolation forest algorithm) that can be implemented within messaging provider anomaly prediction engine 412 is provided below at least with respect to FIG. 5.

Messaging provider recommendation engine 414 is operable to recommend a MOM server to receive a message. For instance, messaging provider recommendation engine 414 can be used to determine an alternate MOM server in cases where another MOM server is predicted to have an upcoming outage. In other words, when a MOM server to which a message is to be delivered to is predicted to have an upcoming outage, messaging provider recommendation engine 414 can recommend an alternate MOM server to route the message to (e.g., an alternate MOM server for delivery of the message). The message can then be routed to the predicted (e.g., recommended) alternate MOM server. In some cases, the recommended alternate MOM server can be the most appropriate alternate MOM server of a group of MOM servers from a performance and scalability perspective.

In some embodiments, messaging provider recommendation engine 414 can include a decision tree-based algorithm, such as a random forest, trained for classification using a modeling dataset generated from performance metrics associated with historical messaging transactions of the MOM servers. Non-limiting examples of the performance metrics associated with historical messaging transactions that can be used to generate the modeling dataset include message type, message size, quality of service (QOS), average cost/latency, memory utilization, CPU utilization, number of producers, and number of consumers. The performance metrics can be collected per historical messaging transaction. The performance metrics associated with the historical messaging transactions of the MOM servers may be retrieved from data repository 410. In one implementation, messaging provider recommendation engine 414 can leverage shallow learning approaches to build the classification models for prediction utilizing an ensemble bagging technique with a random forest algorithm. Shallow learning, as opposed to deep learning, can be more appropriate in cases whether there are a smaller number of data dimensions. The random forest is a supervised learning algorithm that builds (e.g., constructs) an ensemble of decision trees (e.g., classification decision trees). The decision trees may be trained using bagging (also known as bootstrap aggregation). Bagging is a parallel ensemble method that trains the individual decision trees on a subset of the modeling dataset (e.g., the individual decision trees are trained on different data samples and different features). Each decision tree is trained independently and generates a prediction. The final prediction (e.g., output) of the random forest classifier is based on aggregating the predictions of the individual decision trees. For example, the final prediction from the random forest classifier may be based on majority voting after combining the predictions of all decision trees. As such, the generated ML model (i.e., the trained ML classification model) can, in response to input of information about a messaging transaction (e.g., a message to be delivered to a MOM server), predict a MOM server that is optimal for the messaging transaction (e.g., an optimal MOM server to handle the message) based on the learned behaviors (or "trends") in the modeling dataset used in training the ML model. Further description of the ML algorithm (e.g., random forest algorithm) that can be implemented within messaging provider recommendation engine 414 is provided below at least with respect to FIGS. 6 and 7.

Figure 5:
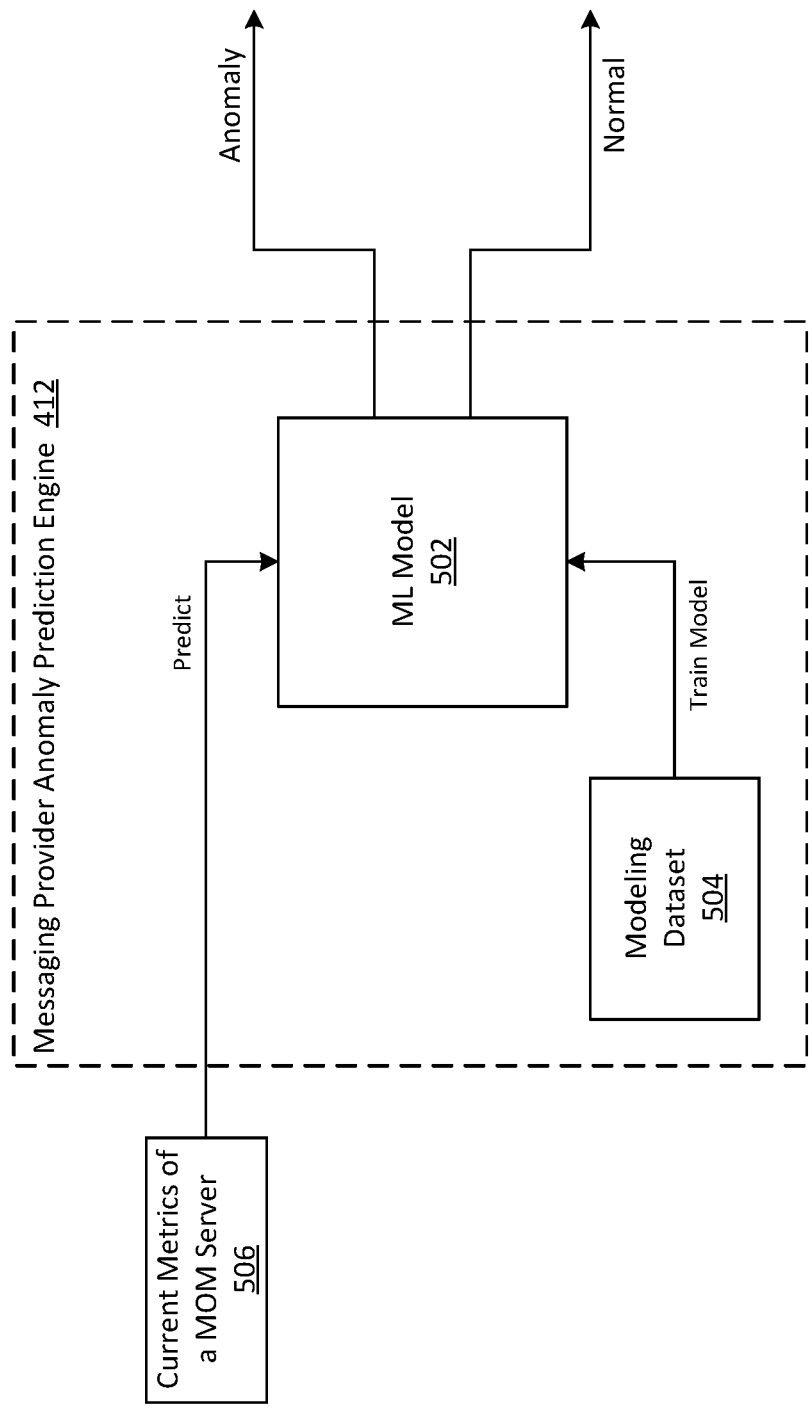
FIG. 5 shows a diagram of an example topology that can be used to predict an anomaly in a message-oriented middleware (MOM) server, in accordance with an embodiment of the present disclosure.

Referring now to FIG. 5, in which like elements of FIG. 4 are shown using like reference designators, shown is a diagram of an example topology that can be used to predict an anomaly in a MOM server, in accordance with an embodiment of the present disclosure. As shown in FIG. 5, messaging provider anomaly prediction engine 412 includes an ML model 502. As described previously, according to one embodiment, ML model 502 can be an ML model generated using an isolation forest algorithm. ML model 502 can be trained using machine learning techniques with a modeling dataset 504. Modeling dataset 504 for training ML model 502 may be generated from the historical server metrics collected from the MOM servers. The historical server metrics can be retrieved from a data repository (e.g., data repository 410 of FIG. 4). In one embodiment, ML model 502 can be trained using three (3) features, e.g., queue depth, number of consumers, and number of producers, of the modeling dataset. Once ML model 502 is sufficiently trained, messaging provider anomaly prediction engine 412 can, in response to receiving current metrics of a MOM server (e.g., data indicative of the current performance of the MOM server), predict an anomaly in the MOM server (e.g., predict whether an upcoming outage is expected for the MOM server). For example, as shown in FIG. 5, messaging provider anomaly prediction engine 412 can generate a feature vector 506 that represents current metrics of a MOM server, such as, for example, queue depth, number of consumers, and number of producers. Feature vector 506 can be input, passed, or otherwise provided to the trained ML model 502. In some embodiments, the input feature vector 506 (e.g., the feature vector representing the current metrics of the MOM server) may include some or all the relevant features which were used in training ML model 502 (e.g., features that are relevant to (or influential in) predicting an anomaly in a MOM server). In response to the input, the trained ML model 502 can output a prediction of an anomaly in the MOM server.

Figure 6:
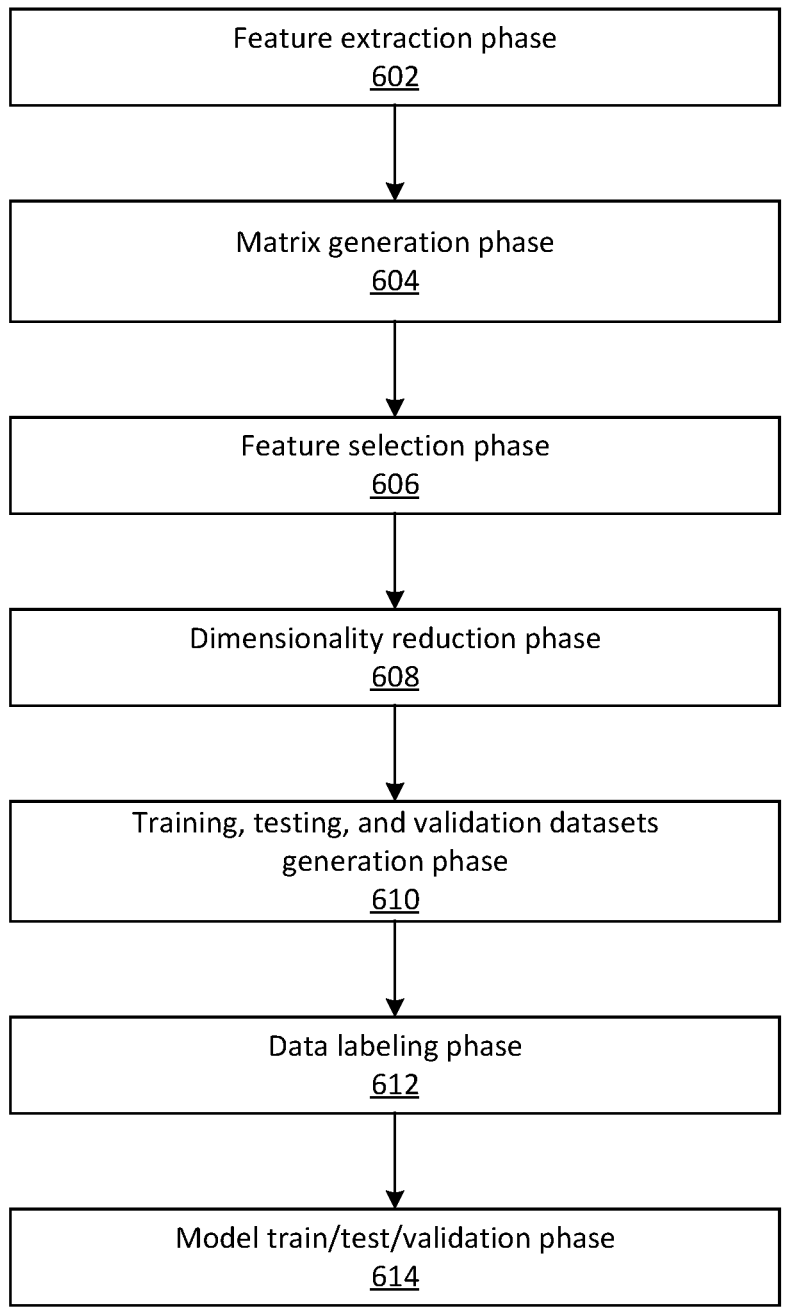
FIG. 6 shows an illustrative workflow for a model building process for the messaging provider recommendation engine of FIG. 4, in accordance with an embodiment of the present disclosure.

Referring now to FIG. 6 and with continued reference to FIG. 4, shown is an illustrative workflow 600 for a model building process, in accordance with an embodiment of the present disclosure. In particular, workflow 600 is an illustrative process for building (or "providing") a ML classification model (e.g., a random forest) for messaging provider recommendation engine 414. As shown, workflow 600 includes a feature extraction phase 602, a matrix generation phase 604, a feature selection phase 606, a dimensionality reduction phase 608, a modeling dataset generation phase 610, a data labeling phase 612, and a model train/test/validation phase 614.

In more detail, feature extraction phase 602 can include extracting features from a corpus of performance metrics associated with historical messaging transactions of the organization's MOM servers (e.g., MOM servers 416). The performance metrics associated with historical messaging transactions of the organization's MOM servers may be retrieved from data repository 410. The historical messaging transactions can include messages from an application (e.g., application 418a) to a MOM server (e.g., MOM server 416). The historical messaging transactions can also include messages from one MOM server to another MOM server (e.g., from a first MOM server 416 to a second MOM server 416). The features may be extracted per historical messaging transaction. In one embodiment, the features may be extracted from the performance metrics associated with one, two, or more years of historical messaging transactions. The amount of historical database transactions from which to extract the features may be configurable by the organization.

Matrix generation phase 604 can include placing the features extracted from the performance metrics associated with the historical messaging transactions in a matrix. In the matrix, the structured columns represent the features (also called "variables"), and each row represents an observation or instance (e.g., a historical messaging transaction). Thus, each column in the table shows a different feature of the instance.

Feature selection phase 606 can include dropping the features with no relevance to the outcome (e.g., removing the features that are not correlated to the thing being predicted). For example, a variety of feature engineering techniques, such as exploratory data analysis (EDA) and/or bivariate data analysis with multivariate-variate plots and/or correlation heatmaps and diagrams, among others, may be used to determine the relevant or important features from the noisy data and the features with no relevance to the outcome (e.g., prediction of a MOM server). The relevant features are the features that are more correlated with the thing being predicted by the trained model. The noisy data and the features with no relevance to the outcome can then be removed from the matrix.

Dimensionality reduction phase 608 can include reducing the number of features in the dataset (e.g., reduce the number of features in the matrix). For example, since the modeling dataset is being generated from the corpus of performance metrics associated with historical messaging transactions of the organization's MOM servers, the number of features (or input variables) in the dataset may be very large. The large number of input features can result in poor performance for machine learning algorithms. For example, in one embodiment, dimensionality reduction techniques, such as principal component analysis (PCA), may be utilized to reduce the dimension of the modeling dataset (e.g., reduce the number of features in the matrix), hence improving the model's accuracy and performance. Non-limiting examples of relevant features of a modeling dataset for training the ML classification model of messaging provider recommendation engine 414 include message type, message size, quality of service (QOS), average cost/latency, memory utilization, CPU utilization, number of producers, and number of consumers.

Training, testing, and validation datasets generation phase 610 can include splitting the modeling dataset into a training dataset, a testing dataset, and a validation dataset. The modeling dataset may be comprised of the individual instances (i.e., the individual historical messaging transactions) in the matrix. The modeling dataset can be separated into two (2) groups: one for training the classification model and the other for testing and validating (or "evaluating") the classification model. For example, based on the size of the modeling dataset, approximately 70% of the modeling dataset can be designated for training the classification model and the remaining portion (approximately 30%) of the modeling dataset can be designated for testing and validating the classification model.

Data labeling phase 612 can include adding an informative label to each instance in the modeling dataset. As explained above, each instance in the modeling dataset is a historical messaging transaction. A label (e.g., an indication of a MOM server) is added to each instance in the modeling dataset. The label added to each instance, i.e., each historical messaging transaction, is a representation of what class of objects the instance in the modeling dataset belongs to and helps a machine learning model learn to identify that particular class when encountered in data without a label. For example, for a particular historical messaging transaction, the added label may indicate a MOM server to which the historical messaging transaction was delivered to.

Model train/test/validation phase 614 can include training and testing/validating the classification model using the modeling dataset. Once the classification model is sufficiently trained and tested/validated, the classification model can, in response to input of information about a messaging transaction (e.g., a message to deliver to a MOM server), predict a MOM server that is optimal for the messaging transaction. For example, training of the classification model can be achieved by passing the portion of the modeling dataset designated for training (i.e., the training dataset) and specifying a number of epochs. An epoch (one pass of the entire training dataset) is completed once all the observations of the training data are passed through the model. The model can be validated using the portion of the modeling dataset designated for testing and validating (i.e., the testing dataset and the validation dataset) once the model completes a specified number of epochs. For example, the model can process the training dataset and a loss value (or "residuals") can be computed and used to assess the performance of the model. The loss value indicates how well the model is trained. Note that a higher loss value means the model is not sufficiently trained. In this case, hyperparameter tuning may be performed by changing a loss function, changing an optimizer algorithm, or making changes to the neural network architecture by adding more hidden layers. Once the loss is reduced to a very small number (ideally close to 0), the model is sufficiently trained for prediction.

Figure 7:
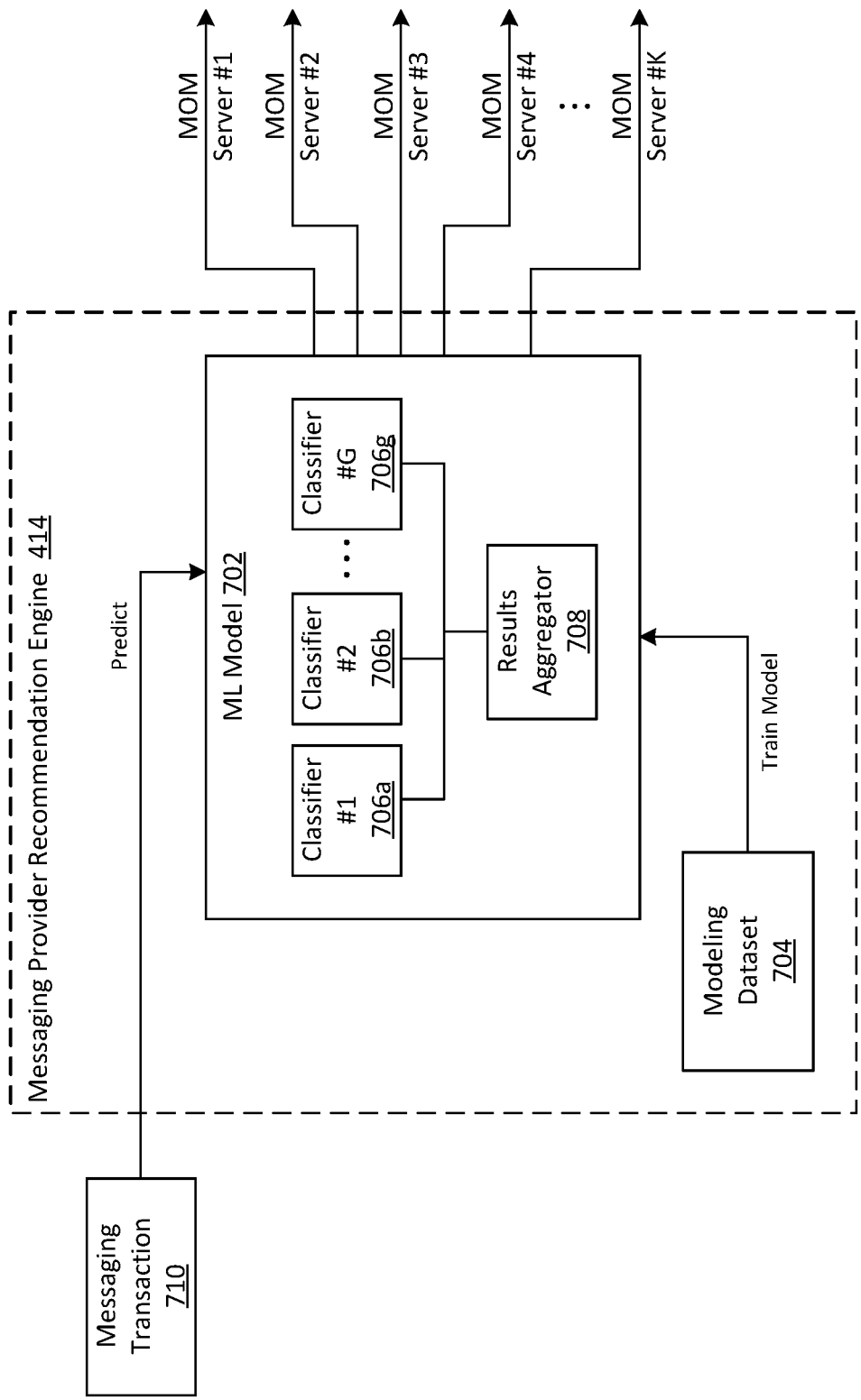
FIG. 7 shows a diagram of an example topology that can be used to recommend a message-oriented middleware (MOM) server, in accordance with an embodiment of the present disclosure.

Referring now to FIG. 7, in which like elements of FIG. 4 are shown using like reference designators, shown is a diagram of an example topology that can be used to recommend a MOM server, in accordance with an embodiment of the present disclosure. As shown in FIG. 7, messaging provider recommendation engine 414 includes an ML model 702. As described previously, according to one embodiment, ML model 702 can be an ML model generated using an ensemble bagging technique with a random forest algorithm. ML model 702 can be trained and tested/validated using machine learning techniques with a modeling dataset 704. Modeling dataset 704 for training ML model 702 may be generated from the collected performance metrics associated with historical messaging transactions of the MOM servers. The collected performance metrics associated with historical messaging transactions can be retrieved from a data repository (e.g., data repository 410 of FIG. 4).

In one embodiment, as can be seen in FIG. 7, ML model 702 can include classifiers 706*a*, 706*b*, . . . , 706*g* (individually referred to herein as classifier 706 or collectively referred to herein as classifiers 706) and a results aggregator 708. In the example of FIG. 7, each classifier 706 may correspond to a decision tree. Each classifier 708 (i.e., decision tree) may be constructed using different data samples and different features from the modelling dataset, which reduces the bias and variance. In the training process, classifiers 706 can be constructed using a portion of the modeling dataset (e.g., approximately 70% of the modeling dataset). In the testing process, the constructed classifiers 706 can be validated using the remaining portion of the modeling dataset (e.g., the portion of the modeling dataset not used in the training process). Hyperparameter tuning may be performed to adjust the number of classifiers 706 constructed in the random forest classifier. To make a prediction for a messaging transaction (e.g., a message to be delivered to a MOM server), the messaging transaction runs through the different classifiers 706 of the random forest classifier, and each classifier 706 generates a prediction (e.g., each classifier 706 yields a score). The prediction made by each classifier 706 is one of multiple classes (e.g., one of multiple MOM servers). Results aggregator 708 is operable generate a final prediction by aggregating the predictions from the individual classifiers 706. For example, results aggregator 126 can output the prediction made by the majority of the different classifiers 706 as the final prediction.

For example, as shown in FIG. 7, messaging provider recommendation engine 414 can generate a feature vector 710 that represents a messaging transaction, such as, for example, message type, message size, cost/time taken, memory utilization, CPU utilization, disk utilization, queue depth, QoS, number of producers, and number of consumers. Feature vector 710 can be input, passed, or otherwise provided to the trained ML model 702. In some embodiments, the input feature vector 710 (e.g., the feature vector representing the messaging transaction) may include some or all the relevant features which were used in training ML model 702 (e.g., features that are relevant to (or influential in) predicting a MOM server). In response to the input, the trained ML model 702 can output a prediction of a MOM server that is optimal for the messaging transaction.

Figure 8:
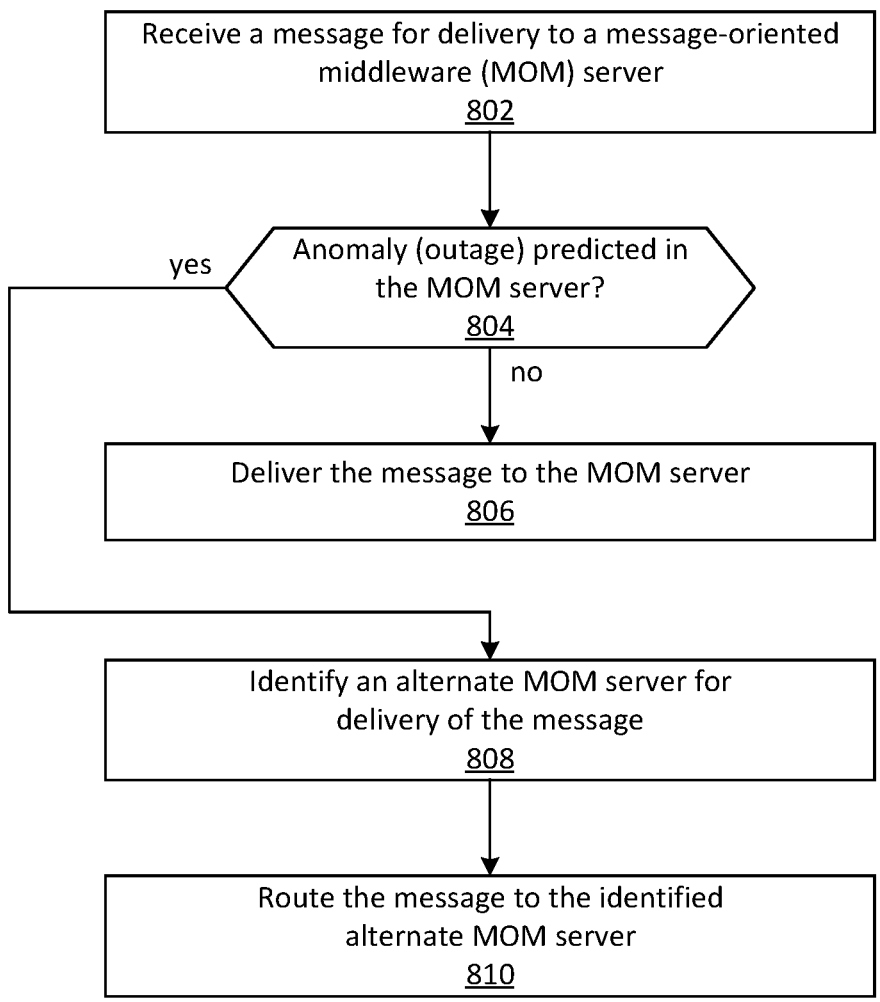
FIG. 8 is a flow diagram of an example process for delivering a message to a message-oriented middleware (MOM) server, in accordance with an embodiment of the present disclosure.

FIG. 8 is a flow diagram of an example process 800 for delivering a message to a message-oriented middleware (MOM) server, in accordance with an embodiment of the present disclosure. Illustrative process 800 may be implemented, for example, within system 400 of FIG. 4. In more detail, process 800 may be performed, for example, in whole or in part by messaging abstraction module 406, messaging provider anomaly prediction engine 412, and messaging provider recommendation engine 414, or any combination of these including other components of system 400 described with respect to FIG. 4.

With reference to process 800 of FIG. 8, at 802, a message for delivery to a MOM server may be received. For example, the message may be sent by a message producer (e.g., application 418*a* of FIG. 4) via a REST API call to a messaging abstraction module (e.g., messaging abstraction module 406).

At 804, a check may be performed to determine whether an anomaly is predicted in the MOM server. For example, predictions of anomalies in the various MOM servers can be made by a messaging provider anomaly prediction engine (e.g., messaging provider anomaly prediction engine 412) and recorded. In some embodiments, the messaging provider anomaly prediction engine can utilize an ML model to make the predictions. The messaging abstraction module may then check the recorded predictions (e.g., the latest prediction made for the MOM server) to determined whether an anomaly is predicted in the MOM server.

If, at 804, a determination is made that an anomaly is not predicted in the MOM server, then, at 806, the message may be delivered to the MOM server. In this case, since an anomaly is not predicted in the MOM server, it can be assumed that the MOM server is operating normally (i.e., the MOM server is not expected to experience an upcoming outage). As a result, the messaging abstraction module can route the message to the MOM server.

Otherwise, if, at 804, a determination is made that an anomaly is predicted in the MOM server, then, at 808, an alternate MOM server for delivery of the message may be identified. In this case, since an anomaly is predicted in the MOM server, the message is not delivered to the MOM server. Rather, an alternate MOM server (e.g., another MOM server) that is operating normally can be identified for delivery of the message (i.e., to receive the message). For example, the messaging abstraction module can utilize a messaging provider recommendation engine (e.g., messaging provider recommendation engine 414) to obtain a recommendation of an alternate MOM server. In some embodiments, the messaging provider recommendation engine can utilize an ML model to predict a MOM server to recommend as the alternate MOM server. In some embodiments, the recommended alternate MOM server may be an optimal MOM server of the other MOM servers to handle the message.

At 808, the message may be routed to the alternate MOM server. For example, the messaging abstraction module can accept the recommendation from the messaging provider recommendation engine and route the message to the MOM server and not to the MOM server in which an anomaly is predicted. As a result, the efficiency and utility of the MOM servers are improved over conventional message handling systems since the message is not routed to a MOM server predicted to have an upcoming outage.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
   receiving, by a computing device, a message for delivery to a message-oriented middleware (MOM) server;
   determining, by the computing device, whether an anomaly is predicted in the MOM server by a first machine learning (ML) model;
   responsive to a determination that an anomaly is predicted in the MOM server, by the computing device:
     predicting an alternate MOM server for delivery of the message using a second ML model; and
     routing the message to the alternate MOM server.

2. The method of claim 1, wherein the message is received by a messaging abstraction layer.

3. The method of claim 1, wherein the message is received from an application via a Representational State Transfer (REST) application program interface (API) call.

4. The method of claim 1, wherein the message is received from another MOM server via an API supported by the another MOM server.

5. The method of claim 1, wherein the first ML model includes an isolation forest.

6. The method of claim 1, wherein the first ML model is built using a modeling dataset generated from historical server metrics of MOM servers.

7. The method of claim 1, wherein the second ML model includes a decision tree-based algorithm.

8. The method of claim 1, wherein the second ML model is built using a modeling dataset generated from performance metrics associated with historical messaging transactions of MOM servers.

9. The method of claim 1, further comprising, responsive to a determination that an anomaly is not predicted in the MOM server, delivering, by the computing device, the message to the MOM server.

10. The method of claim 6 wherein the historical server metrics of MOM servers include one or more of queue depth, number of producers, number of consumers, messages ready, messages unacknowledged, central processing unit (CPU) utilization, memory utilization, and I/O utilization.

11. The method of claim 1 wherein determining whether the anomaly is predicted occurs according to a predetermined schedule.

12. A computing device comprising:
    one or more non-transitory machine-readable mediums configured to store instructions; and
    one or more processors configured to execute the instructions stored on the one or more non-transitory machine-readable mediums, wherein execution of the instructions causes the one or more processors to carry out a process comprising:
      receiving a message for delivery to a message-oriented middleware (MOM) server;
      determining whether an anomaly is predicted in the MOM server by a first ML model; and
      responsive to a determination that an anomaly is predicted in the MOM server:
        predicting an alternate MOM server for delivery of the message using a second ML model; and
        routing the message to the alternate MOM server.

13. The computing device of claim 12, wherein the message is received by a messaging abstraction layer.

14. The computing device of claim 12, wherein the message is received from an application via a Representational State Transfer (REST) application program interface (API) call.

15. The computing device of claim 12, wherein the message is received from another MOM server via an API supported by the another MOM server.

16. The computing device of claim 12, wherein the first machine learning (ML) model is built using a modeling dataset generated from historical server metrics of MOM servers.

17. The computing device of claim 12, wherein the second ML model is built using a modeling dataset generated from performance metrics associated with historical messaging transactions of MOM servers.

18. The computing device of claim 12, wherein the process further comprises, responsive to a determination that an anomaly is not predicted in the MOM server, delivering the message to the MOM server.

19. A non-transitory machine-readable medium encoding instructions that when executed by one or more processors cause a process to be carried out, the process including:
    receiving a message for delivery to a message-oriented middleware (MOM) server;
    determining whether an anomaly is predicted in the MOM server by a first ML model; and
    responsive to a determination that an anomaly is predicted in the MOM server:
      predicting an alternate MOM server for delivery of the message using a second ML model; and
      routing the message to the alternate MOM server.

20. The machine-readable medium of claim 19, wherein the process further comprises, responsive to a determination that an anomaly is not predicted in the MOM server, delivering the message to the MOM server.

\* \* \* \* \*